Nov. 19, 1968  R. SCHEPT  3,412,259
NEUTRALIZATION OF REMANENT MAGNETISM
Filed May 19, 1965

INVENTOR.
ROBERT SCHEPT
BY
Roger W. Jensen
ATTORNEY 3,412,259
NEUTRALIZATION OF REMANENT
MAGNETISM
Robert Schept, St. Louis Park, Minn., assignor to Honeywell Inc., Minneapolis, Minn., a corporation of Delaware
Filed May 19, 1965, Ser. No. 457,153
2 Claims. (Cl. 307—101)

ABSTRACT OF THE DISCLOSURE

A low hysteresis magnetic core structure employing an AC-excited winding separate from the main winding to reset the core periodically. The core structure is provided with minor magnetic loops through slotting of the core. The AC-induced flux flows in these minor magnetic loops so as not to affect the flux produced by the main winding.

The present invention pertains to magnetic cores and more particularly to magnetic cores in applications where the hysteresis effects of the core material are undesirable.

Due to hysteresis, the magnetic state of a ferro-magnetic material at any particular time depends in part on its magnetic history. For this reason an uncertainty error is introduced by hysteresis into the output of any current to magnetic flux converter if the converter has ferromagnetic material in its magnetic circuit. An example of such a magnetic circuit can be found in nuclear magnetic resonance devices such as that shown in Patent 3,167,706, issued on Jan. 26, 1965, to Doyle. There is shown a magnetic core structure for a two loop magnetic circuit, the two loops having a common leg and each loop also having an air gap. A magnetic field is established in the air gaps by a permanent magnet which forms a part of the common leg and also by current through windings on the core structure. For accurate results, it is important that the magnetic field strength in the gaps be dependent on no other variables. However, the hysteresis in the core material yields the result that for every value of magnetic field or magnetic intensity H there are two values of magnetic induction B and the point at which the material is operating depends on the previous magnetic hysteresis of the material. Conversely, every value of B has two possible values of H. The present invention eliminates the uncertainty error due to hysteresis by providing means to assure that for a particular value of H, the circuit is always operating at one particular value of B. This is accomplished by inducing an AC flux in the core structure to periodically preset the ferromagnetic material to a given point on the hysteresis loop. This is accomplished without interfering with the strength of the field in the gap.

It is therefore an object of the present invention to reduce the hysteresis effects in the magnetic core.

More particularly, it is an object of the present invention to provide a magnetic core structure with a gap in which the strength of the magnetic field is substantially independent of the magnetic history of the core.

Figure 2:
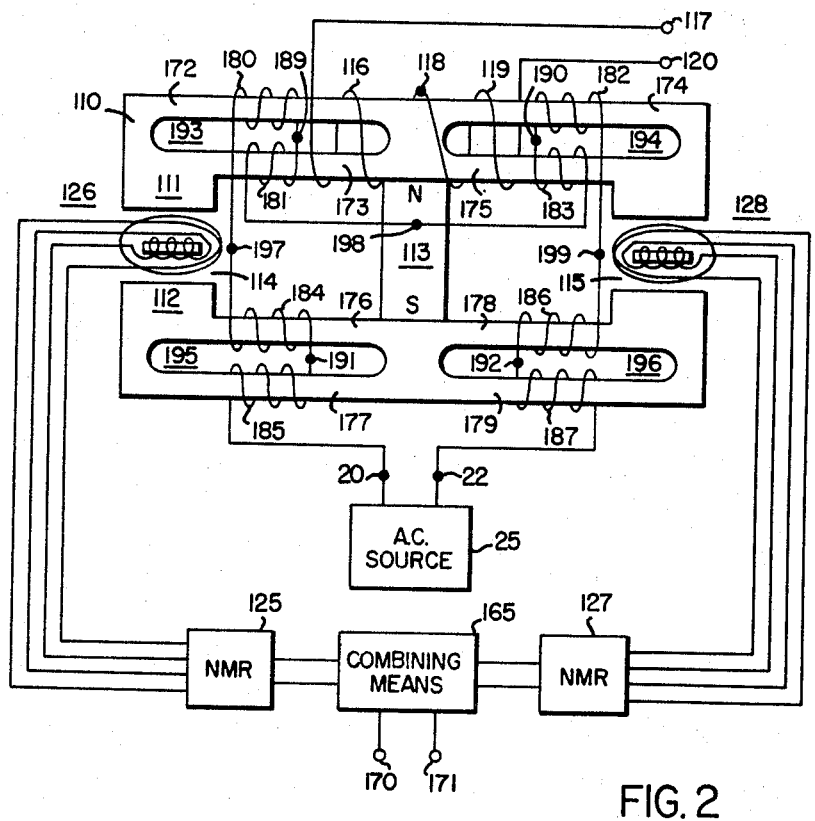
Figure 1:
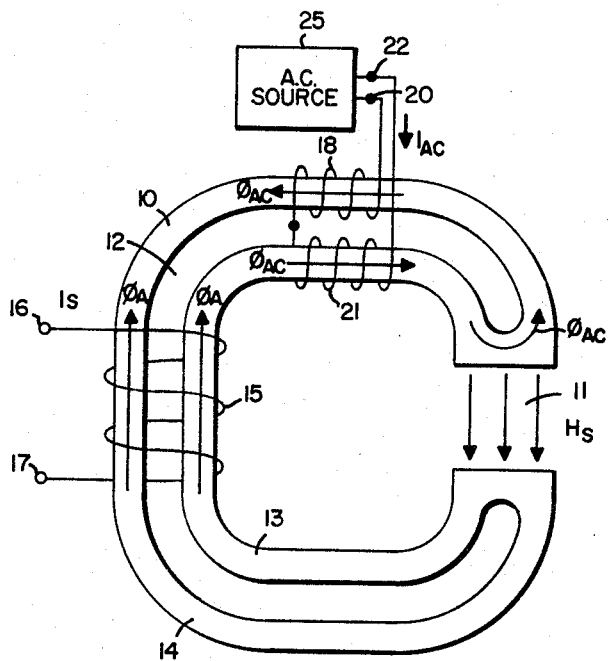

These and further objects will become apparent to those skilled in the art upon examination of the following specification, claims, and drawings, of which:

FIGURE 1 illustrates the application of the present invention in a simple core structure having an air gap; and FIGURE 2 illustrates the present invention as applied to the core structure for application in nuclear magnetic resonance devices such as that shown in U.S. Patent 3,167,706.

Referring now to FIGURE 1, there is shown a C-shaped magnetic core structure 10 with an air gap 11 and a slit 12 extending from the proximity of air gap 11 away from air gap 11, along substantially the entire length of the core structure to the proximity of the other side of air gap 11. Slit 12 divides core 10 into two separate C-shaped members 13 and 14 magnetically isolated from each other at all points except in the proximity of air gap 11, where segments 13 and 14 are joined.

A winding 15 is wound around core structure 10 including both segments 13 and 14 and slit 12. Winding 15 has end terminals 16 and 17 where a signal may be applied to establish and control a magnetic field in core 10 and air gap 11. A winding 18, having end terminals 19 and 20, is wound on segment 14 of core 10. A winding 21 connected at one end to end terminal 19 of winding 18 and having at its other end a terminal 22, is wound on segment 13 of core 10. An AC signal from an AC source 25 is applied between end terminal 20 of winding 18 and end terminal 22 of winding 21 to establish an alternating magnetic field in core 10.

It will be noted that as to winding 15 core sections 13 and 14 form two parallel paths for magnetic field established by current in winding 15 and that the magnetic path for this field has to be closed through the high reluctance path of air gap 11. As to windings 18 and 21, separately, segments 13 and 14 of core 10 are connected in series, so that magnetic field established by a current in winding 18 "flows" from one side of winding 18 through the series path of segments 14 and 13 back to the other side of winding 18 without ever having to cross air gap 11. The same is true of magnetic field established by winding 21. Windings 18 and 21 are connected, as is shown in FIGURE 1, so as to establish magnetic fields oriented in the same direction through the series path of segments 13 and 14, but produce fields which offset and cancel each other as far as their parellel path, which must pass through air gap 11, is concerned. This result is greatly aided by the fact that the reluctance of gap 11 is substantially higher than the reluctance of core structure 10.

Windings 18 and 21 are energized with an AC signal from signal source 25. The effect of the resulting AC field induced in core 10 is to establish a constant magnetic history of the core. At the same time this AC field does not disturb the magnetic field in the gap because the path of the AC field is closed about the perimeter of slit 12 and does not pass through the high reluctance of gap 11.

FIGURE 2 shows the application of the present invention in core structure of the type frequently employed in nuclear magnetic resonance devices as illustrated in Patent 3,167,706, issued to B. Doyle on Jan. 26, 1965. FIGURE 2 shows a magnetic core structure 110 comprised of two C-shaped magnetic members 111 and 112 composed of permeable magnetic material. A permanent bar magnet 113 is physically attached at its two ends respectively to mid-sections of members 111 and 112 to join the C-shaped members so as to provide two approximately equal air gaps 114 and 115 between the ends of said members. The magnetic core structure described forms a magnetic circuit with two loops, the two loops having a common leg formed by magnet 113, and each loop having a reluctance in the form of an air gap. Permanent magnet 113 establishes bias magnetic flux of substantially equal magnitude in the two air gaps 114 and 115.

A winding 116 is wound on a portion of C-shaped member 111 between magnet 113 and air gap 114. Winding 116 is connected at one end to an input terminal 17 and at the other end to a junction 18. A winding 119 is connected on C-shaped member 111 between magnet 113 and air gap 115. Winding 119 has one of its ends connected to junction 118 and has the other end connected to an input terminal 120. Windings 116 and 119 are connected in series and a single current may be applied to the two windings between terminals 117 and 120.

Each of the two C-shaped members 111 and 112 in FIGURE 2 has a pair of slits. Member 111 has a slit 193 between magnet 113 and air gap 114, dividing a portion of member 111 into two parallel segments 172 and 173. Member 111 has a second slit 194 between magnet 113 and air gap 115, dividing that portion of member 111 into two parallel segments 174 and 175. The portion of member 112 between magnet 113 and air gap 114 has a slit 195 dividing that portion of the member into two segments 176 and 177, and the portion of member 112 between magnet 113 and air gap 115 is divided into segments 178 and 179 by a slit 196.

A winding 180 is placed on segment 172 of member 111. Winding 180 has one end connected to a junction 189 and its other end connected to a junction 197. A winding 181 is placed on segment 173 of member 111 and has one of its ends connected to junction 189 and has its other end connected to a junction 198. A winding 183 is placed on segment 175 of member 111 and a winding 182 is placed on segment 174. Windings 182 and 183 are connected together in series at junction 190, while the other end of winding 183 is connected to junction 198 and the other end of winding 182 is connected to a junction point 199. Winding 184 is placed on segment 176 of member 112 and a winding 185 is placed on segment 177 of member 112. Windings 184 and 185 are connected in series at a junction point 191 and winding 184 has its other end connected to junction 197, while winding 185 has its other end connected to an output terminal 20 of an AC source 25. AC source 25 has a second output terminal 22. A winding 186 is placed on segment 178 of member 112 and a winding 187 is placed on segment 179 of member 112. Windings 186 and 187 each have one of their ends connected to a junction 192. The invention, of course, is not limited to this particular arrangement, although in practice it has been found to be convenient. There is no reason why the windings could not be connected in parallel or perhaps even energized from separate sources with equally good results.

FIGURE 2 further shows an NMR device 125 which has its sensitive windings 126 mounted within air gap 114, and an NMR device 127 with its sensitive windings 128 within air gap 115. NMR devices 125 and 127 may be of the spin generator, marginal oscillator, or any of a variety of nuclear magnetic resonance devices. A combining means 165 is shown with output terminals 170 and 171. Combining means 165 receives outputs from NMR devices 125 and 127 and provides an output between output terminals 170 and 171 representative of the frequency difference of the two NMR outputs. The present invention is concerned with providing means for reducing the hysteresis effects of the core structure. It is not restricted to the particular application, shown in FIGURE 2, which illustrates its usefulness in NMR devices. The NMR structure and theory will, therefore, not be discussed here in detail. Further details may be obtained by reference to the above mentioned Patent 3,167,706.

Windings 180 and 187 and energized from AC signal source 25. Due to the relatively high reluctance of the air gaps the alternating magnetic field which is induced in the core structure by these windings will not pass through the gaps, but will rather be closed about the periphery of the associated slit. As a result magnetic fields of equal magnitudes but of opposite sense are experienced by the two segments at each slit. The net magnetic flux flow through the core as a result of the AC signal from source 25 is therefore zero and does not adversely affect the field in the gaps. It affects the field in the gaps only to the extent that it washes out the magnetic history of the core material and removes the effect of hysteresis. This, of course, is the desired result.

Many variations and embodiments are possible within the spirit of the present invention. It is understood, therefore, that the specific embodiment shown is for the purpose of illustration only, and that my invention is limited only by the scope of the appended claims.

I claim:
1. An electric current to magnetic field transducer comprising:
   a magnetic core means for producing a magnetic field, said core means having first and second end means, said core means further having at least one slit extending through the entire thickness of said core means whereby adjacent magnetic paths are formed, separated by said slit and joined at the end of said slit;
   a main winding surrounding said adjacent magnetic paths;
   a first additional winding surrounding only one of said adjacent magnetic paths;
   a second additional winding connected in series with said first additional winding, surrounding only one of said adjacent magnetic paths, said second additional winding wound in a direction opposite said first additional winding whereby a current passed through said first and second additional winding creates a magnetic flux in said adjacent paths encircling said slit; and
   a signal source connected to said additional windings to energize said additional windings with an alternating signal, whereby hysteresis effects in said magnetic core means are minimized.

2. Apparatus claimed in claim 1 wherein said magnetic core means includes means for providing a fixed magnetic bias flux.

References Cited

UNITED STATES PATENTS

| | | | |
|---|---|---|---|
| 1,139,201 | 5/1915 | Luyken | 307—101 X |
| 2,307,774 | 1/1943 | Fisher | 307—101 X |
| 2,778,466 | 1/1957 | Perry | 307—101 X |
| 2,959,722 | 11/1960 | Gilinson | 317—157.5 X |
| 3,167,706 | 1/1965 | Doyle | 324—.5 |

ROBERT K. SCHAEFER, *Primary Examiner.*

T. B. JOIKE, *Assistant Examiner.*